United States Patent
Pendleton et al.

[15] 3,663,144
[45] May 16, 1972

[54] AUTOMATIC PASTRY FORMING APPARATUS

[72] Inventors: Melvin D. Pendleton, 13607 S.E. 192nd, Renton; Arthur C. Pendleton, 10766 68th Ave. S., Seattle, both of Wash.

[22] Filed: May 12, 1970

[21] Appl. No.: 36,635

[52] U.S. Cl.............................................425/287, 425/381
[51] Int. Cl........................................................A21c 11/16
[58] Field of Search..................107/14 R, 14 B, 14 BA, 14 E; 17/35–40; 18/30, 12–14; 25/8, 11–20; 31/8, 13, 14; 73/253–255, 261

[56] References Cited

UNITED STATES PATENTS

| | | | |
|---|---|---|---|
| 2,742,198 | 4/1956 | Belshaw et al.................. | 107/14 E X |
| 3,154,027 | 10/1964 | Belshaw.............................. | 107/14 E |
| 2,023,658 | 12/1935 | Ahacich.............................. | 107/14 E |
| 2,999,469 | 9/1961 | Cottingham et al................. | 107/14 E |

Primary Examiner—Jordan Franklin
Assistant Examiner—Geo. V. Larkin
Attorney—Graybeal, Cole & Barnard

[57] ABSTRACT

Apparatus including a pastry dough storage bowl having a pastry forming cylinder extending downwardly therefrom, and a pair of pistons mounted on concentric piston rods adapted to move in and out of the distal ends of the pastry forming cylinder drawing pastry dough in at one end and extruding out formed pastries at its other end. Cam track and follower means training the movement of the pistons in and out of the pastry forming cylinder such that a partial vacuum is formed within the cylinder which tends to accelerate the movement of pastry dough from the pastry dough storage bowl into the pastry forming cylinder. Additionally, a spring control is provided to regulate the movement of one of the pistons within the pastry forming cylinder to control the size of the individual pastry formed.

8 Claims, 8 Drawing Figures

PATENTED MAY 16 1972 3,663,144

MELVIN D. PENDLETON
ARTHUR C. PENDLETON
INVENTOR.

BY Graybeal, Cole & Barnard

ATTORNEYS

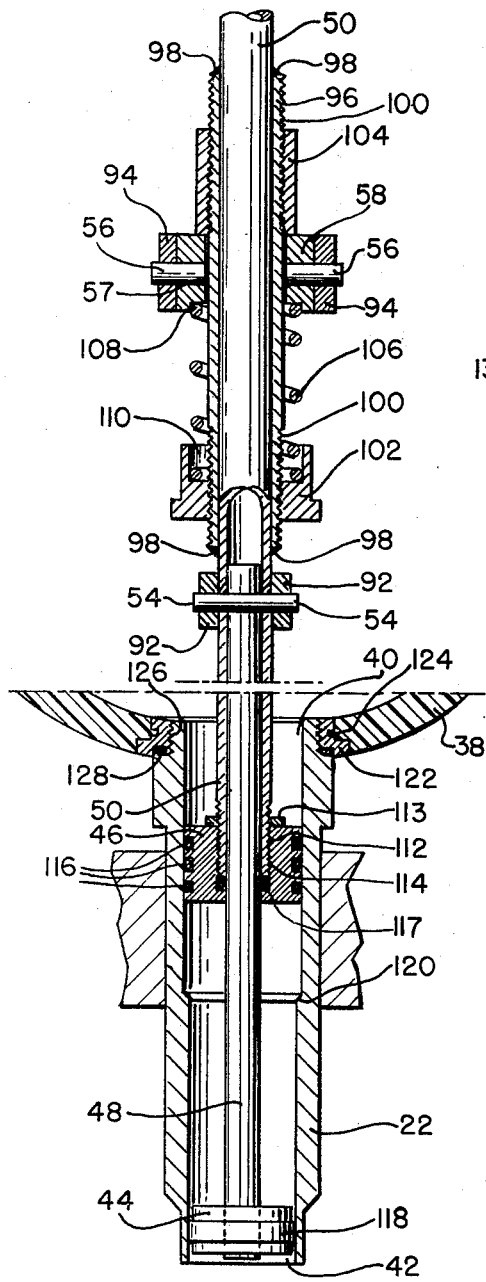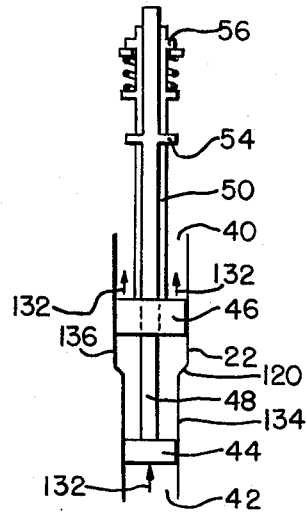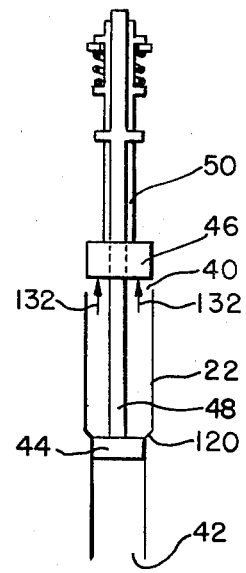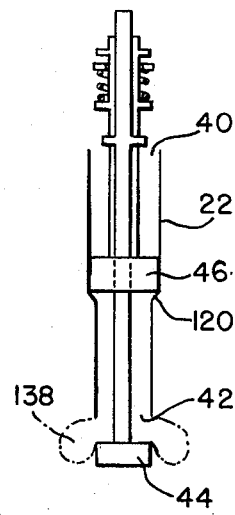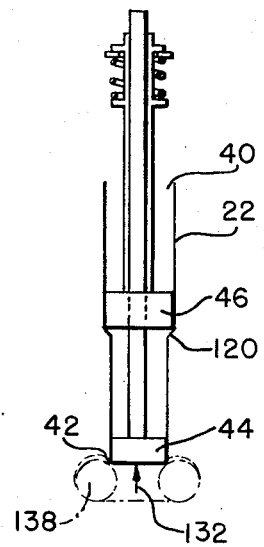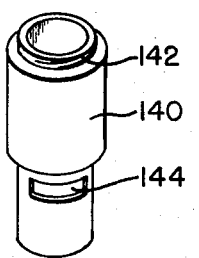
MELVIN D. PENDLETON
ARTHUR C. PENDLETON
INVENTOR.

AUTOMATIC PASTRY FORMING APPARATUS

BACKGROUND OF THE INVENTION

1. Field of the Invention

This invention relates, in general, to pastry forming machines, and in particular, to an automatic pastry forming apparatus of the extrusion type which generates a partial vacuum to draw pastry dough from a storage area into a pastry forming cylinder from which it is then extruded.

2. Description of the Prior Art

The bakery industry is, in general, divided into two types of operations, one being the small shop in which all bakery and pastry sold is manufactured on the premises in relatively small quantities, and the other being large, factory-type, plants in which large quantities of bakery and pastry are manufactured for distribution to bakery chain retail shops, supermarkets or other grocery stores. Both the small and large bakeries produce many varieties of pastries, but a substantial portion of the production of both types of operation comprises doughnuts. The term doughnut as used herein includes pastries of the annular variety as well as the non-hole variety such as the so-called jelly doughnut, bismark or long-john. At present, in small bakery shops doughnuts are usually formed by rolling a batch of pastry dough into a relatively thick sheet and cutting the doughnuts therefrom by hand. Large and expensive machines have been developed to automatically form this type pastry, and such machines are often used in the factory-type bakeries. In general, these automatic machines use relatively high air pressures, often running up to seventy pounds per square inch, to force measured amounts of dough through forming barrels to form the desired pastry. The presently known pastry forming machines have a number of drawbacks including their high monetary cost which makes their use by small bakeries uneconomic, and more important, their tendency to produce an inferior product. The use of high air pressures with yeast dough often causes the dough to be ruined. Yeast is very sensitive to temperature and will die at approximately 140° F., while the optimum yeast propagation temperature is approximately 96° F. High pressure pastry forming machines often build up relatively high heats which injure or kill the yeast and result in an inferior tasting pastry. Additionally, high pressure often causes cellular damage to the yeast.

BRIEF SUMMARY OF THE INVENTION

The present invention provides an automatic pastry forming apparatus which is relatively inexpensive and therefore may be economically purchased by small bakeries, and which does not require the use of high air pressures to extrude the dough, thereby reducing the chance of damaging the pressure and temperature sensitive yeast. In short, the apparatus includes a pastry forming cylinder having a dough intake end and a dough extruding end of different diameter, and further having a pastry dough storage area connected to the intake end, mounted such that a pair of pistons on concentric piston rods move into and out of the ends of the pastry forming cylinder. The concentric piston rods, and thus the pistons mounted thereon, are trained in their vertical movement through a conventional follower system by a pair of cam tracks having differing configurations mounted on the opposite sides of a wheel driven by a power source. The movement of the pistons in and out of the different sized ends of the pastry forming cylinder creates a partial vacuum in the cylinder which tends to accelerate the movement of pastry dough from the pastry dough storage area into the pastry forming cylinder through which it is then extruded to form a pastry.

It is an object of the present invention, therefore, to provide an apparatus for automatically forming a pastry from pastry dough.

An additional object is to provide a pastry forming apparatus which is relatively inexpensive to manufacture, and in which the temperature of the dough may be held at acceptable levels.

Another object is to provide an apparatus which generates a partial vacuum which tends to move pastry dough into a forming cylinder.

One more object is to provide an apparatus wherein the size of the pastry to be produced may be strictly controlled and easily varied.

An additional object is to provide a pastry forming apparatus having a cylinder through which individual pastries may be rapidly extruded.

Still another object is to provide a pastry forming apparatus which may be mounted in tandem with a plurality of like apparatus and driven by a single power source.

Additional objects and advantages of the present invention will become apparent from the following description taken in conjunction with the accompanying drawings.

BRIEF DESCRIPTION OF THE DRAWINGS

FIG. 3 is a view taken along lines 3—3 in FIG. 1.

FIG. 4 is a diagrammatic illustration of the placement of the concentric piston rods and pistons within the pastry forming cylinder prior to pastry dough intake.

FIG. 5 is a diagrammatic illustration of the apparatus of FIG. 4 showing piston placement at the time of dough intake into the pastry forming cylinder.

FIG. 6 is a diagrammatic illustration of the apparatus of FIG. 4 showing the pastry being extruded out the extruding end of the pastry forming cylinder.

FIG. 7 is a diagrammatic illustration of the apparatus of FIG. 4 showing the lower piston cutting off the formed pastry.

FIG. 8 is a perspective view of a typical embodiment of a pastry forming cylinder made according to the present invention adapted to make non-hole pastries such as jelly doughnuts.

DETAILED DESCRIPTION OF THE INVENTION

Figure 1:
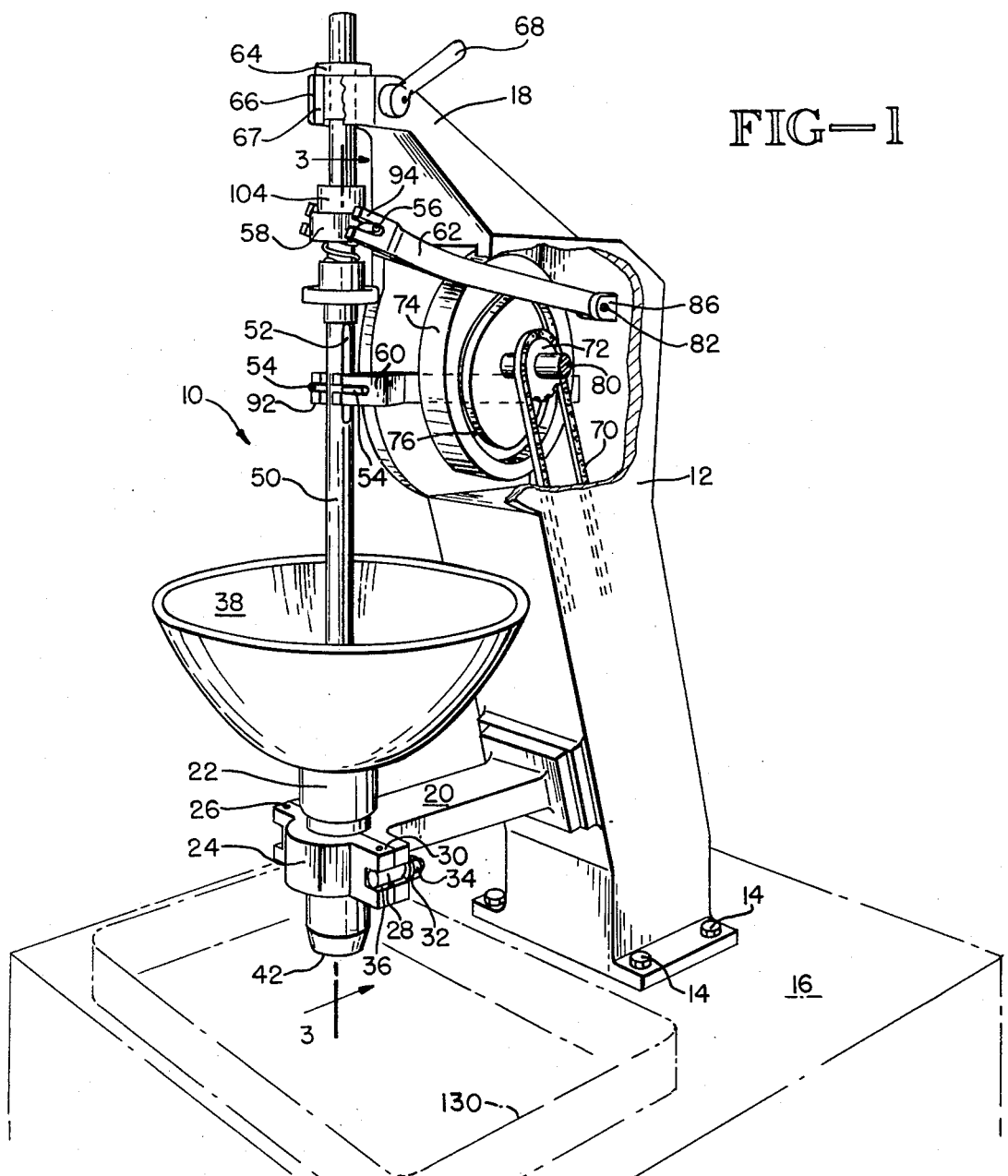
FIG. 1 is a perspective view of a typical embodiment of the present invention, including a partial sectional view of the drive chain and a cam track and follower.

Referring now to FIG. 1 of the drawings, an automatic pastry forming apparatus 10, typifying the present invention is disclosed. Apparatus 10 includes support means 12, which is mounted by means of conventional bolts 14 to table 16. Support means 12 may be constructed of cast iron, pressed sheet steel or other conventional materials. Support arms 18 and 20 extend outwardly from support means 12 to hold the elements of the invention described below. Support arm 20 includes outer portion 24 which is adapted to releasably clamp pastry forming cylinder 22. Portion 24 is adapted to pivot with respect to support 20 about pin 26, while bolt 28 which is pivotal about pin 30 and includes washer 32 and nut 34 on its threaded end, is adapted to pivot in and out of slot 36 to fixedly hold portion 24 against support arm 20. Pastry dough storage means 38, comprising a bowl having a threaded hole in its bottom portion (see FIG. 3) is connected to the upper end of pastry forming cylinder 22.

Referring also to FIG. 3, it will be seen that pastry forming cylinder 22 varies in internal diameter, being larger at the dough intake end 40 of the cylinder than at the extruding end 42. Pistons 44 and 46 are adapted to move in and out of the ends of pastry forming cylinder 22, and as will be discussed more completely below, piston 46 is adapted to fit snugly within the intake end of the cylinder while piston 44 is adapted to fit snugly within the extruding end of the cylinder. Piston 44 is mounted on piston rod 48, while piston 46 is mounted on hollow piston rod 50 in which piston rod 48 is centered. Piston rod 50 includes opposed slots 52 through which lugs 54 extend normally outward from piston rod 48, while lugs 56 extend normally outward from collar 58 which is freely mounted on piston rod 50. Rocker arms 60 and 62 are adapted to engage lugs 54 and 56 to transmit motion from the drive means, which will be described below, to the piston rods 48 and 50 and pistons 44 and 46. Crown bearing 64 is disposed about piston rod 50 near its upper end, such that the piston rod moves vertically therein. Conventional clamp means 66 including slot 67 having a width approximately equal to the diameter of piston rod 50 is provided to hold crown bearing 64. Actuation of handle 68 tightens or loosens the grip of clamp 66 on the crown bearing. When the grip of the clamp is loosened, crown bearing 64 may be slid upwardly from between the jaws of the clamp and piston rod 50 pivoted outwardly through slot 67. Drive means such as a one-half horsepower, variable speed electric motor (not shown) may be disposed below table 16, and connected by conventional means through a gear box to chain 70. Sprocket 72 about which chain 70 moves is fixedly mounted on shaft 80 which is in turn rotatably mounted on conventional roller bearings (not shown) set in the opposed walls of support means 12. Wheel 74 is fixedly mounted on shaft 80 and thus rotates therewith. Cam tracks 76 and 78 on the opposed flat sides of wheel 74 differ in shape and thus, as will be described hereafter, train piston rods 48 and 50 for non-identical motion. Cam tracks 76 and 78 are non-circular, and it should be understood that their shape may vary so long as the resultant vertical movement through which piston rods 48 and 50 are trained approximates the movement which will be described hereafter with reference to FIGS. 4–7. In one previously constructed embodiment of the invention, wheel 74 is approximately 1 inch thick while tracks 76 and 78 have a depth of approximately three-eighths of an inch.

Figure 2:
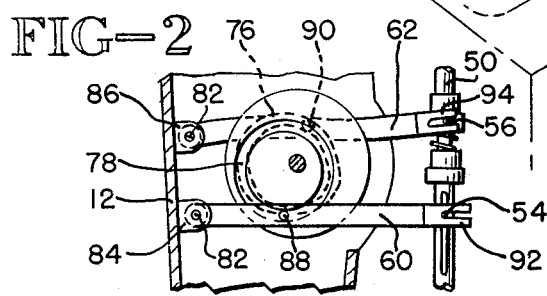
FIG. 2 is a partial side elevation view of a second cam track and follower of the instant invention.

Referring now to FIG. 2, it will be seen that rocker arms 60 and 62 are connected by means of conventional pins 82 to ears 84 and 86 which extend inwardly from support means 12. It is understood that the rocker arms may be connected to support means 12 by other conventional means such as pins extending through holes drilled on each side of the support means, for example. Rocker arm 60 includes roller cam follower 88 which is adapted to run in cam track 78, while rocker arm 62 includes roller cam follower 90 which is adapted to run in cam track 76. The portion 92 of arm 60 which is distal ear 84 is substantially Y-shaped, with the arms of the Y additionally being forked. Lugs 54 which extend outwardly from piston rod 48 are engaged by and ride in the forked end 92 of rocker arm 60. In like manner, lugs 56 extending outwardly from piston rod 50 are disposed to ride in the forked end 94 of rocker arm 62.

From the above, it will be seen that the transmission of power from the conventional drive means (not shown) through shaft 80 and the sprocket and chain mounted thereon, to cam track carrying wheel 74 causes the ends 92 and 94 of rocker arms 60 and 62 to move up and down in the vertical direction. The shape of cam tracks 76 and 78 on the opposed faces of wheel 74 is such that the movement of end portions 92 and 94 of the rocker arms which are trained by cam followers 88 and 90 running in these cam tracks is non-identical.

Referring again to FIG. 3, it will be seen that piston rod 50 includes sleeve 96 fixedly mounted thereon by means of welds 98. Sleeve 96 includes external threads 100 near its top and bottom which are adapted to cooperate with internally threaded collars 102 and 104. As shown, collar 58 is slidably mounted on the central unthreaded portion of sleeve 96. Lugs 56 extend outwardly from slots 57 in collar 58 into which they are brazed. It is understood that lugs 56 and collar 58 could also be molded as a single unit. Collar 104 is threaded onto sleeve 96 to the bottom of external threads 100 such that collar 58 is at all times below these threads. Collar 58 is supported against the bottom portion of collar 104 by relatively stiff spring 106.

Spring 106 is coiled about sleeve 96 such that its bottom portion rests in channel 110 of collar 102 while its top portion rests in channel 108 of collar 58. Looking upward along sleeve 96, in FIG. 3, clockwise rotation of collar 102 about sleeve 96 tends to shorten and stiffen spring 106 such that collar 58 is held with added force against the bottom of collar 104. Counterclockwise rotation of collar 102, in turn, tends to elongate spring 106 and make it more flexible. It will be readily understood that during operation of the instant apparatus force is transmitted from end 94 of rocker arm 62 downwardly on lugs 56 thereby tending to compress the spring 106 and force piston rod 50 downwardly. The degree of elongation and consequent stiffness or flexibility of spring 106 consequently controls the depth to which piston 46 which is mounted on piston arm 50 moves within pastry forming cylinder 22. As will be seen from the discussion below, the depth of movement of this piston controls the size of the individual pastry product formed.

Piston 46 includes internal threads 112 which cooperate with threads 114 disposed near the bottom of piston rod 50 to hold the piston to the piston rod. Nut 113 is also threaded on piston rod 50 to prevent vibrational loosening of the piston. Resilient ring seals 116 are disposed externally of piston 46 to form a tight seal between the piston and the upper internal bore of pastry forming cylinder 22, while resilient ring seal 117 is disposed around rod 48 at the end of threads 114 to prevent leakage of vacuum through the hollow shaft. Piston 44 is mounted in a similar conventional manner on the end of piston rod 48 and includes a single relatively wide resilient ring seal 118 disposed centrally therearound to form a tight seal between the piston and the lower internal bore of pastry forming cylinder 22. The internal shoulder 120 between the upper and lower portions of cylinder 22 is sloped to allow easy movement of dough thereover.

Pastry storage bowl 38, as disclosed, is constructed of a cast resin and includes a metal O-ring 122 cast into the bottom portion of the bowl to define a central opening therein. It is understood, however, that bowl 38 may be constructed of other conventional materials such as stainless steel. O-ring 122 includes external grooves 124 into which the cast resin flows to provide a firm connection between the O-ring and the bowl. Internal threads 126 are also provided on the O-ring, which threads are adapted to cooperate with a set of threads disposed externally on the top end of pastry forming cylinder 22. O-ring seal 128 is provided at the connection between the O-ring and the pastry forming cylinder to ensure that this seal is airtight thus preventing leakage of the partial vacuum which is formed adjacent this area in the pastry forming cylinder and the bottom of bowl 38 during operation as will be discussed below.

In operation, an amount of pastry dough sufficient to form a number of individual pastries is disposed in dough storage bowl 38, and power is supplied to the apparatus to set it in motion. Piston 46 is moved in and out of the dough intake end of pastry forming cylinder 22, while piston 44 is moved in and out of the dough extruding end of pastry forming cylinder 22 to move portions of dough from the dough storage bowl 38, through the pastry forming cylinder 22, and out end 42 of the cylinder in the form of individual pastries. As will be described hereafter, the movement of the pistons within the cylinder is such that a partial vacuum is created in the pastry forming cylinder such that when piston 46 moves out of the cylinder and into bowl 38, the partial vacuum acts to accelerate the movement of dough from the bottom of bowl 38 into the cylinder. The individual pastries which are extruded out end 42 of the pastry forming cylinder may be deposited on a tray 130 shown in dotted line resting on table 16 in FIG. 1, or may be deposited directly on an endless belt running beneath the pastry forming cylinder.

Referring now to FIGS. 4–7, the movement of pistons 44 and 46 within pastry forming cylinder 22 to form a pastry will be described. Arrows 132 illustrate the direction of movement of pistons 44 and 46. In FIG. 4, the two pistons are moving upwardly at the same rate and are spaced apart a distance approximately equal to the length of lower bore 134 or upper bore 136, which in the disclosed embodiment, are equal. It will be readily understood that the length of internal bores 134 and 136 may be varied with respect to each other, which variance may be compensated for by a change in the cam track training the related piston, such that the desired relational movement between the pistons and cylinder of piston 44 reaching shoulder 120, as piston 46 reaches intake end 40 of the cylinder is obtained.

Referring now to FIG. 5, it will be seen that piston 44 ceases its upward travel when it reaches shoulder 120. Piston 46, however, continues to move upwardly into the dough in the bottom of dough storage bowl 38. As will be readily understood, the dough forms an airtight seal at the sides of the bowl and thus the additional upward movement of piston 46 enlarges the area below piston 46 normally defined by the internal walls of the cylinder 22 and the top of piston 44 without allowing air to move into this area to equalize the pressure therein with that of the surrounding atmosphere. Thus, a partial vacuum is created within the upper bore of pastry forming cylinder 22, which partial vacuum tends to cause the dough in the bottom of bowl 38 to be pushed into the pastry forming cylinder by the higher pressure of the surrounding atmosphere. In one embodiment of the present invention, piston 46 moves up an additional two inches after piston 44 has stopped at shoulder 120 and it has been found that this additional movement is sufficient to fill the upper bore of pastry forming cylinder 22 with dough.

In FIG. 6, pistons 44 and 46 have traveled downwardly together, piston 46 forcing the pastry dough within the pastry forming cylinder ahead of it. At the bottom of the piston stroke, piston 44 extends out of opening 42 of the pastry forming cylinder thereby allowing a portion of pastry dough 138 sufficient to form a single piece of pastry to be extruded out of the cylinder behind it. In practice it has been found that an opening of approximately five-eighths of an inch between the top of piston 44 and the bottom of cylinder 22 is sufficient to allow the pastry dough to move easily out of the cylinder. As shown in FIG. 7, piston 44 initiates the upward stroke of the machine by traveling upwardly a short distance while piston 46 remains stationary in the region of shoulder 120. The upward motion of piston 44 cuts off the dough 138 which has been extruded out of the pastry forming cylinder and forms it in the familiar annular shape. It will thus be understood that the bottom portion of cylinder 22 is filled with pastry dough at all times during operation of the machine. Although not shown, the upward movement of piston 44 to cut off the dough leaves a central ridge in the center of the doughnut hole which is a desirable structural feature. The extent of the upward movement of piston 44 while piston 46 remains stationary is substantially equal to the upward movement of piston 46 while piston 44 remains stationary as was discussed with reference to FIG. 5. After this initial movement by piston 44 is completed, both pistons 44 and 46 travel upwardly together to repeat the cycle. One embodiment of the instant invention which has been constructed in accordance with the above teachings is capable of producing up to 340 dozen pastries per hour.

Referring now to FIG. 8, a jelly doughnut, or non-hole pastry forming die 140 is disclosed. This die is adapted to be substituted for pastry forming cylinder 22 described above, and although not illustrated, includes a variable diameter bore in which pistons 44 and 46 create a partial vacuum during filling of the die with dough in the same manner as described above. Die 140 includes a threaded top portion 142 which is adapted to cooperate with threads 126 of dough storage bowl 38. Pastry dough forced through die 140 is extruded out of opening 144 in the lower portion of the die. This sideways extrusion allows an individual pastry to be formed which does not have a hole in its center and which thus may be filled with jelly or custard as is commonly known in the bakery industry.

It will be readily understood that the above described apparatus may be mounted in tandem with a plurality of other like machines to produce large volumes of pastry.

The present invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus for forming pastry of the type including support means, cylinder means disposed on said support means, said cylinder means having a dough intake end and a dough extruding end, dough storage means integrally connected to said dough intake end of said cylinder means, first piston means movable in and out of the dough intake end of said cylinder means, second piston means movable in and out of the dough extruding end of said cylinder means, and drive means associated with said first and second piston means, the improvement comprising:

drive means moving said first and second piston means in said cylinder means such that said first piston means moves upwardly into said dough storage means while said second piston means is held stationary in said cylinder means to rapidly create a partial vacuum within said cylinder means to accelerate the movement of dough from said storage means into said cylinder means.

2. The apparatus of claim 1 wherein said drive means for said first piston means includes compressible spring means resiliently transmitting motive force from a driving member to said first piston means.

3. The apparatus of claim 1 wherein said first piston means is mounted on a support rod and wherein said drive means includes first and second collar means spacedly mounted on said support rod, and spring means and associated third collar means mounted on said support rod between said first and second collar means, said third collar means adapted to be reciprocably driven on said support rod to transmit motive force to said first piston means through said spring means.

4. The apparatus of claim 3 wherein the position of said first or second collar means on said support rod is longitudinally adjustable to vary the tension in said spring means to cause said pastry forming apparatus to produce pastries of different size.

5. Apparatus for forming pastry of the type including support means, cylinder means disposed on said support means, said cylinder means having a dough intake end and a dough extruding end, dough storage means integrally connected to said dough intake end of said cylinder means, first piston means movable in and out of the dough intake end of said cylinder means, said piston means movable in and out of the dough extruding end of said cylinder means, and drive means associated with said first and second piston means, the improvement comprising:

drive means for said first piston means including compressible spring means resiliently transmitting motive force from a driving member to said first piston means.

6. Apparatus for forming pastry of the type including support means, cylinder means disposed on said support means, said cylinder means having a dough intake end and a dough extruding end, dough storage means integrally connected to said dough intake end of said cylinder means, first piston means movable in and out of the dough intake end of said cylinder means, second piston means movable in and out of the dough extruding end of said cylinder means, and drive means associated with said first and second piston means, the improvement comprising:

cylinder means including a first portion adjacent said dough intake end and a second portion having a smaller volume than said first portion adjacent said dough extruding end, and drive means moving said first and second piston means downwardly respectively in said first and second cylinder portions to move dough from said first cylinder portion to said second smaller volume cylinder portion.

7. The apparatus of claim 6 wherein said drive means associated with said first piston means includes compressible spring means such that said first piston means is resiliently moved downwardly into the first portion of said cylinder.

8. The method of forming a pastry comprising the steps of placing pastry dough into a pastry forming apparatus of the type including first and second pistons mounted to move into and out of a cylinder associated with said reservoir including the steps of:

simultaneously moving said first and second pistons upwardly in said cylinder till said first piston is adjacent the upper end of said cylinder, holding said second piston means stationary, continuously moving said first piston means upwardly into said dough storage means to rapidly create a partial vacuum in said cylinder to accelerate the movement of dough into said cylinder, moving said first and second piston means downwardly through said cylinder till said second piston means clears the bottom edge of said cylinder such that said first piston means forces a predetermined amount of dough out of said cylinder, and moving said second piston means upwardly into said cylinder to cut off said extruded dough to form a pastry.

* * * * *